C. G. HOAG.
BALLOT.
APPLICATION FILED MAY 17, 1919.

1,404,611.

Patented Jan. 24, 1922.

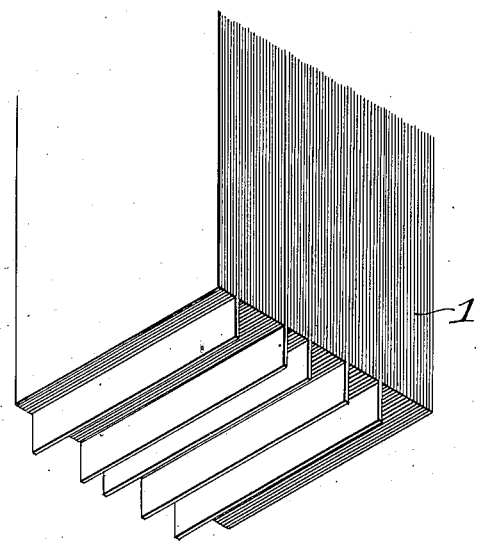
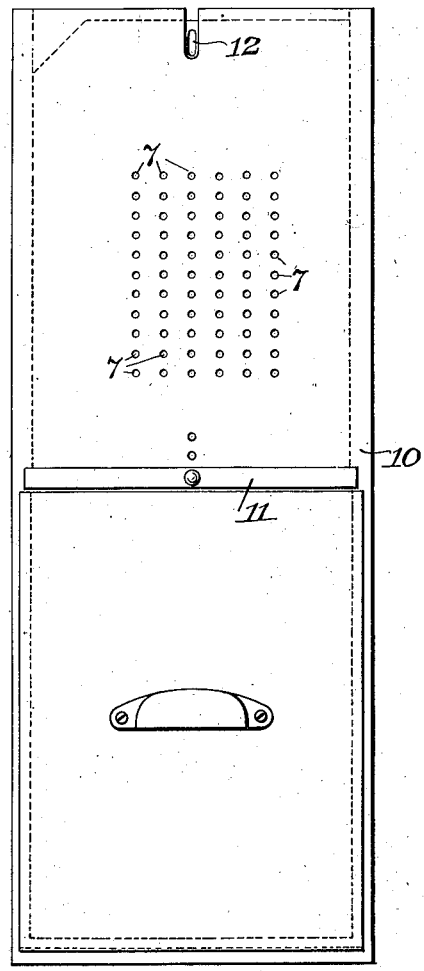
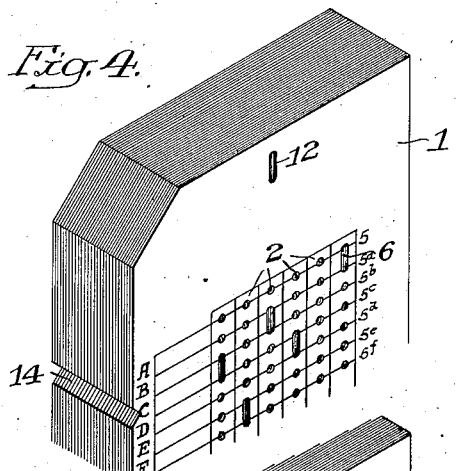
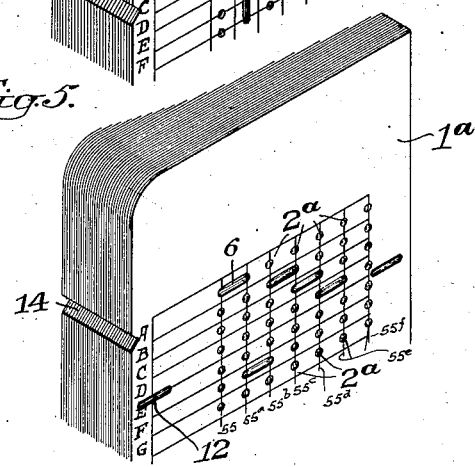
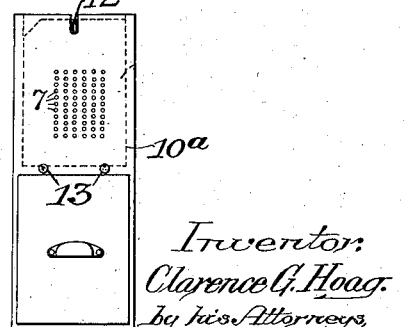

UNITED STATES PATENT OFFICE.

CLARENCE G. HOAG, OF HAVERFORD, PENNSYLVANIA.

BALLOT.

1,404,611.  Specification of Letters Patent.  Patented Jan. 24, 1922.

Application filed May 17, 1919. Serial No. 297,879.

*To all whom it may concern:*

Be it known that I, CLARENCE G. HOAG, a citizen of the United States, residing in Haverford, Delaware County, Pennsylvania, have invented certain Improvements in Ballots, of which the following is a specification.

My invention relates to voting or balloting systems, and comprises generally special means, and a special manner of using the same, which may be employed for voting for candidates for office; public or private. While my improved method or system of voting and the use of the accessories employed therewith has been designed more particularly for carrying out the principles of the so-called "Hare system of proportional representation", and other preferential systems, used proportionally or non-proportionally, its use is not limited thereto, and it may be employed with any system or method of voting.

One object of my invention is to make use of a perforated card as a ballot in which the perforations may be connected by slots to facilitate handling of such ballots by segregating means.

A further object of my invention is to provide a perforated card ballot wherein slots may be formed by connecting, vertically or horizontally, any pair of holes disclosed therein to indicate a vote for or choice of candidate.

A further object of my invention is to provide a perforated card ballot wherein the spacing between the vertical or horizontal rows of holes will be of such a character that with the means employed for the purpose of connecting a pair of holes to form a slot, it will be impossible to connect any pair of the holes by a slot except in the manner desired or indicated upon the ballot.

A further object of my invention is to provide the face of such ballot with means clearly indicating or differentiating the columns in which first, second, third, et seq., "choices" of candidates are to be indicated; and a still further object is to provide means whereby certain ballots which have been counted for a particular candidate may be segregated from all other ballots employed in an election proceeding and identified for further reference.

These and other features of my invention are more fully described hereinafter, reference being had to the accompanying drawings, in which:

Figure 1, is a face view of one form of ballot embodying my invention.

Fig. 2 is a similar view illustrating another form of ballot within the scope of my invention.

Fig. 3, is a perspective view illustrating a plurality of card ballots showing certain of the same displaced according to one of the choices indicated on the same whereby separation of such ballots from the whole number used may be readily effected.

Figs. 4 and 5, are perspective views illustrating certain card ballots of the types shown in Figs. 1 and 2, respectively, which have been separated from the main body of ballots cast and provided with uniform indicating means whereby said separated ballots may be subsequently identified and distinguished from all other ballots cast, and Figs. 6 and 7, show forms of drawers or receptacles in which the cards may be placed for segregation and subsequent separation.

It is quite common in segregating systems to provide cards with circular apertures therein set at intervals; to place upon such cards indicia having a certain bearing or relation to the various apertures and sets of apertures, and to provide means whereby any two of said apertures may be connected to form an elongated slot or opening that will permit of independent movement of a card or cards similarly slotted with reference to other cards with which they may be stacked, for the purpose of segregating the same.

If a rod is passed through one of the apertures originally formed in said cards, part of which now constitutes one of the terminal or end walls of such slot, such cards are free to move in one direction or the other upon such rod, longitudinally of said slot, and as said rod will hold the unslotted cards against movement, the sloted cards may be moved out of their position with reference to the other cards, and can subsequently be separated and removed from the other cards. In the improved ballots forming the subject of my invention, I have utilized the slot formation to facilitate separation of the card ballots after they have been employed in a voting or election proceeding.

In Figs. 1 and 2, of the drawings, 1 and 1ª represent card ballots, perforated at 2 and 2ª, respectively; such perforations being equidistantly placed vertically as well as horizontally, excepting that the horizontal spacing may be greater or less than the vertical spacing and may have no relation thereto insofar as unity of measurement is concerned or, if desired, it may have a particular relation thereto, so that if punching means are provided in the form of a properly spaced cutter to connect any two apertures of the form of card ballot shown in Fig. 1, on a vertical line, such cutter will not be suitable for connecting any two of the apertures in horizontal alignment. In like manner, if the cutter is arranged to connect two of the apertures in horizontal alignment in the form of card ballot shown in Fig. 2, it cannot be used to connect two of the apertures in vertical alignment. By such arrangement of the perforations or apertures of the card ballots, provision is made to insure that slotting of the card ballot by connecting a pair of the apertures will be in vertical lines only, if of the type shown in Fig. 1, or in horizontal lines only, if of the type shown in Fig. 2; thereby surely avoiding slotting a card ballot in both directions, or in a wrong direction.

The cards when employed as ballots will contain the names of all the candidates, of whom a certain number are to be elected, and in the form of card ballots shown in Figs. 1 and 2, these names are at the left-hand side of the same. They may be otherwise disposed as circumstances may require or the election officials may desire. Under one so-called proportional system, for example, vertical columns, or horizontal rows, are provided to indicate the choices by number; that is to say, "first choice," "second choice," "third choice," et seq., and rows or columns may indicate the candidates. If the columns include the vertical lines of perforations or apertures, the rows are between the horizontal lines of apertures. If the columns are between the vertical lines of apertures, the rows include the horizontal lines of perforations or apertures.

In the form of card ballot shown in Fig. 1, the candidates are indicated at "A," "B," "C," et seq., and the several horizontal lines of perforations or apertures are indicated at 5, 5ª, 5ᵇ, et seq. In using these cards as ballots for voting purposes, the slots indicating the choice of the voter are to be formed between pairs of directly adjacent apertures of the vertical lines. When any candidate receives a "first choice" vote, the card ballot is slotted as at 6 in the first vertical line or column between that pair of apertures or perforations of the horizontal lines immediately above and below the name of the candidate. For example, if candidate Richard Slow, indicated at "C," receives the "first choice" vote, the slot is made between the third and fourth horizontal lines of apertures or perforations in the first vertical column, directly opposite his name, and indicated at 5ᵇ and 5ᶜ. A "second choice" candidate, "F" for instance, will be indicated by making a slot connecting the proper pair of apertures in the sixth and seventh horizontal rows of apertures or perforations in the second vertical column, directly opposite his name, and indicated at 5ᵉ and 5ᶠ. A "third choice" may be indicated by making a slot between the proper pair of the apertures or perforations in vertical alignment in the third column, directly opposite the name of the candidate, indicated herein as candidate "B," and formed between the apertures of lines 5ª and 5ᵇ, and so on.

In using the card ballots shown in Fig. 2, the slots are to be formed horizontally between apertures or perforations of directly adjacent vertical lines. When any candidate receives a "first choice" vote, the card is slotted horizontally between any pair of apertures or perforations of the vertical columns 55 and 55ª, immediately adjacent the candidate's name; other and succeeding choices being indicated similarly, by connecting apertures in horizontal alignment opposite the candidates' names in the proper columns according to the preference or choice of the voter. To make the "choice" columns easily distinguishable, in addition to marking them "first choice;" "second choice," etc., they may be lined or shaded or otherwise surface marked, and such lining or shading may be of a character to indicate color, or distinguishing colors may be applied to these "choice" columns.

In Figs. 1 and 2, I have shown, for illustrative purposes only, card ballots carrying the names of a plurality of candidates; ten in the present instance, of which five are to be elected, and have also shown indicia designed to facilitate a voter in making and recording his preference or choice and the order of the same, for any number of candidates up to six. The names of the candidates may be at the left side of the ballots, as shown in the drawings, but it will be understood, of course, that they may be disposed at the right side of the ballots, or disposed across the "choice" columns, without departing from my invention.

The voting, as clearly indicated upon the ballots portrayed in Figs. 1 and 2, is effected by joining pairs of apertures in the "choice" columns, or flanking the "choice" columns, as the case may be, to form slots 6, which are afterwards utilized in connection with means employed to segregate the ballots and ascertain the votes cast for the several candidates as "first choice"; "second choice"; "third choice", &c.

From any batch of cards (ballots), all those which indicate a particular candidate as the voter's choice of a particular rank or standard, (his "first choice"; his "second choice", or his choice of any other grade) may be separated, for any purpose, from the rest of the batch by placing the entire batch in a suitable container or drawer 10, or 10$^a$, such for instance as those shown in Figs. 6 and 7, or by placing them in alignment by other means. Then by inserting a rod through one of the master holes 7 in the box front at the lower end of the slot position corresponding to the choice and candidate, and displacing in some suitable manner all the cards (ballots) not held in place by said rod, as by withdrawing a partition or slide 11 mounted in the drawer shown in Fig. 6, and allowing the cards (ballots) to be displaced by gravity, those held or supported by the rod in the initial position may be separated from the rest of the batch by inserting a rod through an aperture or perforation 12 provided at the upper end or top portion of the card ballots—a portion of such aperture of sufficient size to receive the rod lying above the displaced cards—and then withdrawing the other rod and allowing the displaced cards to fall. If the card ballots are disposed in an open tray having no partition or slide such as that above described, the separation may be effected by lifting the rod applied to the lower end of the slot portion of the candidate whose votes are being counted.

Or this separation may also be done by placing the cards so that the slots are horizontal, inserting a rod through the master hole at one end of the proper slot position, and rotating the container or other device holding the cards for securing correct alignment through 90° in the proper direction so that the cards having the slot in question are displaced by gravity by a distance equaling the length of the slot and can, therefore, be conveniently segregated.

Or it may be done as is usual when somewhat similar cards are used for other purposes by placing the card ballots so that the slots are vertically disposed, inserting a rod through the master hole at the top of the proper slot position, and then inverting the container or other holder for securing correct alignment.

By inserting two or more rods, it is possible to determine all the card ballots on each of which particular choices are expressed for two or more candidates. By successive operations, ballots having any combination of choices may be conveniently segregated from the rest.

In lieu of a form of drawer such as shown in Fig. 6, having a slide or partition 11, I may utilize a drawer structure such as shown in Fig. 7, in which a pair of rods 13 may take the place of the slide or partition 11. These rods will be in place when the cards are inserted in the drawer, and thereafter they will be employed or manipulated in a manner precisely similar to the manipulation of the slide or partition of the drawer structure shown in Fig. 6.

In order that ballots counted to the credit of a particular candidate may be subsequently identified, they may be notched on one edge in line with the row or column, as the case may be, which indicates that candidate. Such notching can be readily effected by placing the cards in a suitable support and operating a notching plane or similar instrument across the proper edges of the cards in line with the row or column which indicates the proper candidate. In Fig. 4, I have shown a bunch of ballots of the character shown in Fig. 1, which have been separated or segregated as having been counted to the credit of a candidate; the "first choice", for instance, provided with a notch 14 along the edge of the same, while Fig. 5, shows a similar bunch of ballots of the character shown in Fig. 2, with a notch 14 along the edge of the same indicating another candidate as having had these ballots counted to his credit. Any other batch of ballots may be similarly notched for future identification at any place or position on the edge of each ballot set aside for the purpose. Under a system of voting wherein the same ballot may be counted successively to the credit of more than one candidate, some of the ballots will bear more than one notch.

Suitable mechanical means such as trays, drawers, rods, hinges, and the like may be provided to facilitate the manipulation of ballots slotted to indicate choice of candidates in accordance with my invention without departing from the spirit thereof, and the slotting of the designating or classification holes may be effected by any suitable mechanical means readily operable by the voter, which should be of such a character that only pairs of slots in the desired direction, depending upon the character of ballot used, can be connected.

The master holes for sustaining the ballots in a drawer or other suitable structure while separation of the same is being effected, may be at the top or at the bottom; the other accessories being similarly modified so that separation can be effected in the same manner, or substantially the same manner as indicated with reference to ballots having a master hole at the top. In like manner, the ballot of the type shown in Fig. 2, has the master hole at the side;—either side, depending upon the position it is most convenient to place them for the purpose of segregation.

I have shown in the drawings ballots upon which ten candidates are named, with a limit of six choices. It will be understood, of course, that such showing in nowise limits the manner of using my improved ballots, and that they may carry as many candidates as may be desired, and the choices or choice columns may equal the number of candidates, or be any number less than the number of candidates; the voter being free to vote as many choices as he pleases equaling or less than the choice columns indicated.

While I have shown ballots in which spaces for candidates names are completely filled, it will be understood that blank spaces may be provided in which the name of a candidate may be written, and that the rows or lines of perforations provided will be sufficient in number to take care of any blank spaces so provided.

The candidates' names may be in line with the perforations, or in lines parallel with the lines of perforations; either arrangement being within the scope of the appended claims.

I claim:

1. A card ballot having rows of perforations arranged in two directions; the perforations lying in one direction being associated with names of candidates, while the perforations lying in the other direction are associated with indicia whereby choice or rank among the candidates may be indicated; said card ballot being adapted to be utilized for voting by connecting pairs of perforations with slots in such a way as to indicate the voter's preference among the candidates.

2. A card ballot having rows of perforations arranged in two directions; the perforations lying in one direction being associated with names of candidates, while the perforations lying in the other direction are associated with indicia whereby the voter's choice among the candidates may be indicated; said card ballot being adapted to be utilized by forming slots between pairs of perforations in such relation as to indicate the voter's order of preference among the candidates.

3. A card ballot having a plurality of perforations arranged in horizontal and vertical lines; the names of candidates appearing on the ballot opposite the perforations extending in horizontal lines, and the vertical lines being correlated with indicia corresponding to the voter's choices; said card ballot being adapted to be utilized for the purpose of indicating the voter's preference among candidates by connecting vertically pairs of adjacent perforations opposite the names of candidates and in the lines corresponding to the voter's choices for those candidates.

4. A card ballot having a plurality of perforations arranged in lines at right angles to each other; the names of candidates appearing on the ballot opposite one set of lines, and the other lines being correlated with indicia corresponding to the voter's choices; said card ballot being adapted to be utilized for the purpose of indicating the voter's order of preference among the candidates by connecting pairs of adjacent perforations opposite the names of candidates and in the lines corresponding to the voter's choices for those candidates.

5. A card ballot having rows of perforations arranged in two directions; the lines in one direction being associated with the voter's choices for candidates; the card ballot being provided with surface markings to clearly distinguish the columns in which pairs of perforations should be connected by slots to indicate choice or rank of the candidates voted for.

6. A card ballot having rows of perforations arranged in two directions; the distance between adjacent perforations being uniform in each direction, but the distance in one direction differing from that in the other, so that means may be arranged to connect adjacent perforations in one direction only.

7. A card ballot having a plurality of perforations arranged in lines at right angles to each other and adapted to have adjacent pairs of perforations connected to form slots; the distance between adjacent perforations in the several lines being uniform in each direction, but the distance in one direction differing from that in the other, so that the slotting means arranged to connect adjacent perforations may be employed in one direction only.

8. A card ballot having rows of perforations arranged in two directions; the distance between the perforations extending in one direction differing from the distance between the perforations extending in the other direction; pairs of said perforations being available for the formation of slots in predetermined positions.

9. A card ballot having a plurality of perforations available for the formation of slots to indicate the voter's choice of candidates; said card being notched at the edge to indicate the candidate for whom said ballot has been counted.

10. A card ballot having a plurality of perforations available for the formation of slots at predetermined places to indicate the voter's choice of candidates and the order or rank of preference; said card being notched at the edge to indicate the candidate for whom said ballot has been counted.

11. A card ballot having a plurality of perforations; pairs of said perforations being available for the formation of slots at predetermined places; said cards carrying an additional preformed slot whereby separation of cards slotted in one position may be effected from those slotted in another position.

12. A card ballot having perforations available for the formation of slots; said cards carrying an additional slot whereby separation of the cards slotted in one position from those slotted in another position may be effected, and notches at the edges of said cards to indicate the candidate for whom said ballot has been counted.

13. A card ballot having perforations arranged in rows in two directions; said perforations being available for the formation of slots in either of said directions to indicate the voter's choice of candidates; said cards carrying an additional slot whereby separation of the cards slotted in one position may be effected from those slotted in another position, and notches at the edges of said cards to indicate the candidate for whom said ballot has been counted.

14. A card ballot having a plurality of perforations arranged in lines at right angles to each other; the names of candidates appearing on the ballot opposite one set of lines, and the other lines being correlated with indicia in different colors corresponding to the voter's choices; said card ballot being utilized for voting by connecting pairs of adjacent perforations opposite the names of candidates.

15. A card ballot having rows of perforations arranged in two directions; the lines in one direction being associated with the voter's choices for candidates; the card ballot being provided with surface markings in color to clearly distinguish the predetermined lines in which pairs of perforations should be connected by slots to indicate choice or rank of the candidates voted for.

16. The process of identifying card ballots counted for a candidate, which consists in collecting said ballots; the name of the candidate appearing on the face of said ballots, and thereafter notching the edges of said ballots in line with the name of the said candidate.

CLARENCE G. HOAG.